United States Patent

Hallman et al.

[15] 3,637,378

[45] Jan. 25, 1972

[54] RADIATION-SENSITIVE ELEMENT, PROVIDED WITH FLEXIBLE BASE AND METHODS FOR EXPOSING AND PROCESSING THE SAME

[72] Inventors: Robert W. Hallman, Utica; Gary W. Kurtz, Southfield, both of Mich.

[73] Assignee: Teeg Research, Inc., Detroit, Mich.

[22] Filed: Oct. 20, 1969

[21] Appl. No.: 867,575

Related U.S. Application Data

[63] Continuation-in-part of Ser. No. 642,972, June 1, 1967, which is a continuation-in-part of Ser. No. 591,711, Nov. 3, 1966, abandoned. Ser. No. 841,416, July 14, 1969, which is a continuation-in-part of Ser. No. 627,754, Apr. 3, 1967, abandoned, Ser. No. 841,718, July 15, 1969, which is a continuation-in-part of Ser. No. 627,813, Apr. 3, 1967.

[52] U.S. Cl. ....................................96/35, 96/27 R, 96/36, 96/36.2, 96/36.3, 96/36.4, 96/85, 96/87, 96/88, 156/3, 156/4, 156/17, 156/18, 250/65 R, 250/65.1, 117/7

[51] Int. Cl. ....................................G03c 5/04, G03c 5/00

[58] Field of Search......................96/1.5, 27, 36, 36.2, 36.3, 96/86, 88, 35; 252/501; 117/93.3, 217; 156/3, 4, 17, 18; 29/195; 250/65, 65.1

[56] References Cited

UNITED STATES PATENTS

| | | | |
|---|---|---|---|
| 3,082,085 | 3/1963 | Miller et al. | 96/1.5 |
| 3,122,463 | 2/1964 | Ligenza et al | 156/4 |
| 3,271,180 | 9/1966 | White | 96/36 X |
| 3,312,548 | 4/1967 | Stranghan | 252/501 X |
| 3,346,384 | 10/1967 | Gaynor | 96/36 |
| 3,377,169 | 4/1968 | Blake | 96/88 |
| 3,386,823 | 6/1968 | Keller et al. | 96/27 |
| 3,440,046 | 4/1969 | Droege et al. | 96/27 |

FOREIGN PATENTS OR APPLICATIONS

| | | |
|---|---|---|
| 344,354 | 3/1931 | Great Britain |
| 968,141 | 8/1964 | Great Britain |
| 1,151,310 | 9/1969 | Great Britain |

OTHER PUBLICATIONS

Kostyshin et al., " Photographic Sensitivity Effect in Thin Semiconducting Films on Metal Substrates," Soviet Physics–Solid State, Vol. 8, No. 2, Feb. 1966, pp. 451–452.

*Primary Examiner*—George F. Lesmes
*Assistant Examiner*—R. E. Martin
*Attorney*—Hauke, Gifford and Patalidis

[57] ABSTRACT

Radiation-sensitive elements comprising a substantially thin metallic layer coating a flexible sheet material such as paper, cardboard, plastic, and the like, and provided with an overlayer disposed on the metallic layer made of an inorganic material capable of interreacting with the metal or metals of the metallic layer when exposed to electromagnetic actinic radiation. The overlayer may be in a solid phase or a vapor phase. After exposure to electromagnetic actinic radiation, the element is processed by removing the product resulting from the interaction between the metallic layer and the inorganic material of the overlayer, removing the overlayer for some applications, and darkening or dying the metallic image thus obtained on the flexible backing.

7 Claims, 9 Drawing Figures

PATENTED JAN 25 1972

3,637,378

INVENTORS
ROBERT W. HALLMAN
GARY W. KURTZ

By Hauke, Gifford & Patalidis
ATTORNEYS

RADIATION-SENSITIVE ELEMENT, PROVIDED WITH FLEXIBLE BASE AND METHODS FOR EXPOSING AND PROCESSING THE SAME

CROSS-REFERENCE TO RELATED APPLICATIONS

The present application is a continuation-in-part of application Ser. No. 642,972, filed June 1, 1967, which was a continuation-in-part of application Ser. No. 591,711, filed Nov. 3, 1966, and now abandoned. The present application is related to copending application Ser. No. 841,416, filed July 14, 1969, which is a continuation-in-part of application Ser. No. 627,754, filed Apr. 3, 1967, and now abandoned, and copending application Ser. No. 841,718, filed July 15, 1969, which is a continuation-in-part of application Ser. No. 627,813, filed Apr. 3, 1967, and now abandoned.

BACKGROUND OF THE INVENTION

In the parent application and in the copending applications, there are disclosed radiation-sensitive elements which typically consist of a metallic layer, as defined therein and herein, which may be provided with a support backing or substrate, the metallic layer being coated with an adhering overlayer of an inorganic material capable of interreacting with the metal or metals of the metallic layer when exposed to incident electromagnetic actinic radiation, such as, for example, intense white light and the like. The radiation-induced interreaction between the metallic layer and the overlayer extends in depth from the interface between the metallic layer and the overlayer proportionally to the exposure of the radiation-sensitive element. There is formed at the interface between the metallic layer and the overlayer, as a result of such radiation-induced interreaction, a product or products having chemical compositions and physical characteristics different from those of the constituents of both the metallic layer and the overlayer. Such interreaction products may be removed by mechanical action, chemical action, or by heating the exposed radiation-sensitive element thus causing sublimation of the interreaction product or products.

The remaining portions of the overlayer may also be removed by mechanical action, chemical action, photochemical action, or by heat sublimation, which may be done, in some applications, simultaneously with the removal of the interreaction products.

In copending application, Ser. No. 839,038, filed July 3, 1969, which is a continuation-in-part of application Ser. No. 636,864, filed May 8, 1967, and now abandoned, there is also disclosed a method for obtaining a relief image by subjecting a metallic surface as defined therein to the action of incident electromagnetic actinic radiation in the presence of an inorganic material capable of reacting with the metallic surface as a result of such exposure to electromagnetic actinic radiation. The inorganic material may be in a liquid or vapor phase and include any one of the elements, compounds or mixtures disclosed in the other copending applications.

SUMMARY OF THE INVENTION

The present invention utilizes a radiation sensitive element comprising a "metallic" layer, i.e., a layer of silicon or of a common metal, disposed upon a flexible support backing, substrate or base, such as paper, cardboard, plastic and the like. The metalic layer is provided with an overlayer of inorganic material capable of interreacting with silicon or the metal or metals of the metallic layer when exposed to incident electromagnetic actinic radiation. Such overlayer may be in a solid form adhering to the metallic layer, or, in some applications in a vapor phase. After selective and discrete exposure to electromagnetic actinic radiation resulting from projecting upon the surface of the radiation-sensitive element a predetermined image or pattern, there is caused a radiation provoked selective and discrete interreaction between the inorganic material of the overlayer and silicon or the metal or metals of the metallic layer. As the purpose of the present invention is to preferably obtain a silicon or metallic pattern upon a flexible substrate or base, exposure to electromagnetic actinic radiation is effected for a period of time long enough and under a radiation intensity strong enough to cause, selectively and discretely, complete reaction in depth of the metallic layer, with production of interreaction product or products, which discretely and selectively completely exhausts all of the metallic layer at the areas struck by the electromagnetic actinic radiation. After removal of the interreaction product, a silicon or metallic image or pattern on the flexible substrate or base is thus obtained, and where more contrast is desired, the image or pattern is subsequently dyed, darkened or toned so as to be more contrasting with respect to the appearance of the support backing or base.

The present invention, consequently, has particular applications for obtaining reproduction of printed materials, drawings, documents, writings and the like, and provides both articles and processes which, among others, present the advantages of simplicity and economy as compared to the more conventional articles and processes.

BRIEF DESCRIPTION OF THE DRAWINGS

The several objects and advantages of the present invention will become readily apparent to those skilled in the art when the following description of examples of preferred embodiments of radiation-sensitive elements according to the present invention and of illustrative methods contemplated for practicing the invention is read in conjunction with the accompanying drawings, wherein like numerals refer to like or equivalent parts, and in which.

DESCRIPTION OF THE PREFERRED EMBODIMENTS

Figures 1, 2, 3, 4, 5, 6, 7, 8, 9:
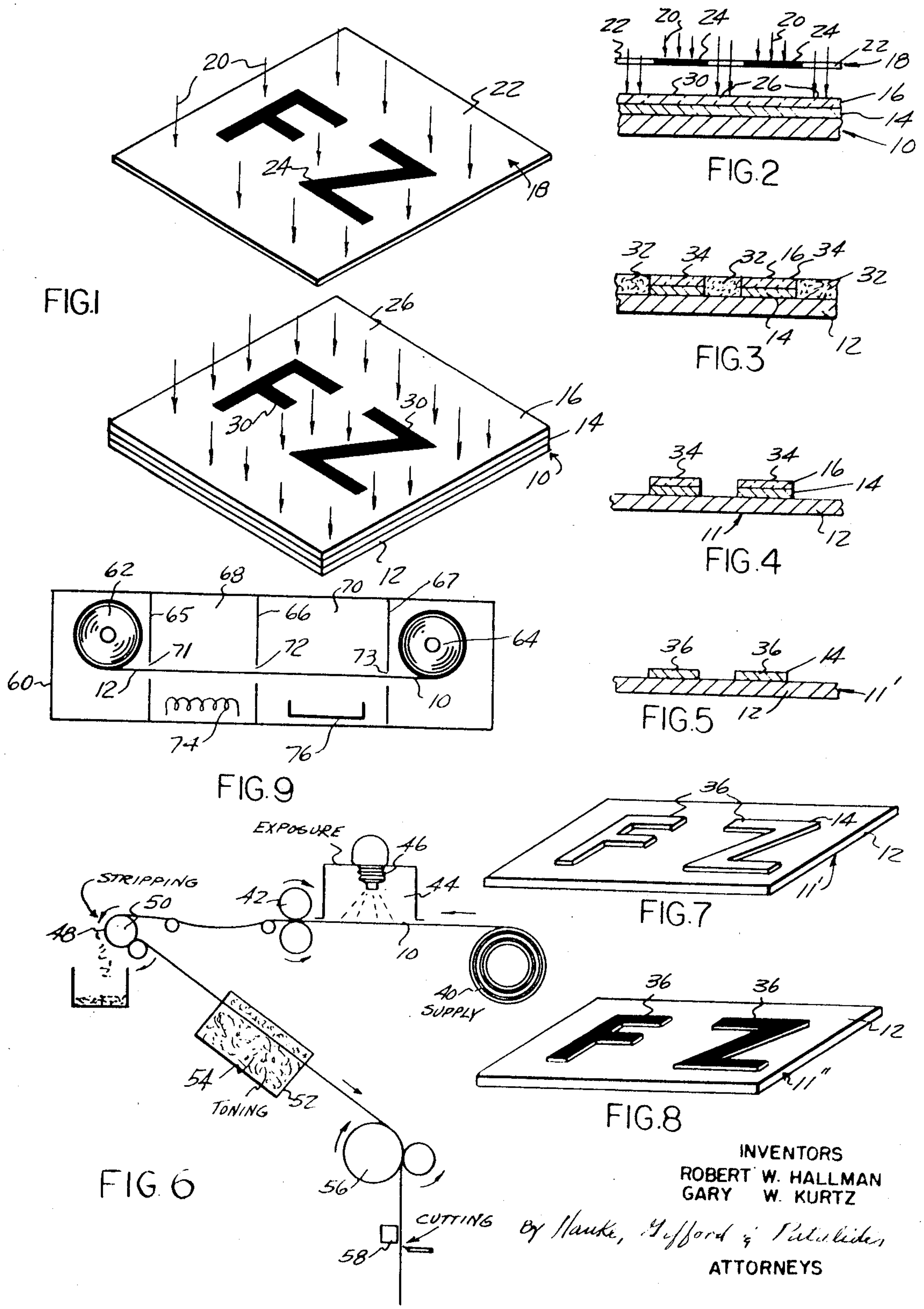
FIG. 1 is a perspective schematic representation of a radiation-sensitive element according to the present invention in the course of being selectively and discretely exposed to incident electromagnetic actinic radiation.
FIG. 2 is a schematic sectional view thereof.
FIG. 3 is a view similar to FIG. 2, but showing the element after selective and discrete exposure to electromagnetic actinic radiation.
FIG. 4 is a view similar to FIG. 3, but showing the element after removal of the product formed as a result of the radiation-provoked interreaction between the metallic layer and the overlayer.
FIG. 5 is a view similar to FIG. 4, but showing the element after removal of the remaining unreacted portions of the overlayer.
FIG. 6 is a schematic representation of an arrangement of elements for practicing the present invention.
FIG. 7 is a schematic perspective view of a finished article according to the present invention.
FIG. 8 is a view similar to FIG. 7, but showing a modification of the finished article.
FIG. 9 is a schematic representation of an example of apparatus used for the manufacture of the radiation-sensitive elements of the present invention.

Referring to the drawings, and more particularly to FIGS. 1 and 2 thereof, a radiation-sensitive element according to the present invention, indicated generally at 10, comprises a flexible substrate, support backing or base 12, consisting for example, of paper, cardboard, plastic, or the like, coated with an adhering metallic layer 14 consisting of a thin layer or film of silicon or metal or metals which may be as thin as a few atom layers or a few angstroms. The metallic layer is deposited upon the base 12 by any conventional means well known in the art, such as bonding thereto, electrolytic or electroless plating, vapor deposition, cathode sputtering, etc. By "metallic" layer herein is meant a layer containing silicon or at least one metal either alone, alloyed with another metal or with other metals, or in the form of a metallic mixture. The metallic layer 14 may thus include any one of common metals such as silver, copper, lead, cadmium, zinc, iron, tin, arsenic, bismuth, cobalt, germanium, indium, manganese, mercury, nickel, selenium, silicon, tellurium, thallium, and vanadium.

Upon the metallic layer 14 is disposed an adhering layer or overlayer 16 of any one of the inorganic materials disclosed in the aforesaid parent application and copending applications, such material or materials being capable when exposed to electromagnetic actinic radiation to interreact with silicon or the metal or metals of the metallic layer 14 for forming therewith an interreaction product or products having chemical compositions and physical characteristics different from those of the constituents. The overlayer 16 is also substantially thin, preferably as thin as a few atom layers or a few angstroms, and is shown as being in a solid form, although it may be in a vapor phase. The use of an overlayer 16 of vapor radiation reacting materials as particularly disclosed in copending patent application Ser. No. 839,038, filed July 3, 1969, is particularly convenient with respect to the present invention, as it greatly simplifies the already simple processing of the sensitive element into a finished article provided with a silicon or metallic image or pattern upon a flexible or pliable substrate or base, as will be hereinafter explained in further details.

The material of overlayer 16 may be any one of a group of a variety of ternary and binary inorganic materials and compounds and any one of a few elements. An example of ternary material, which has been found to be particularly suitable, is a glassy material consisting of arsenic, sulfur and iodine for example in the following proportions: arsenic—40 percent by weight, sulfur—50 percent by weight, and iodine—10 percent by weight, although the proportion of iodine may be within the range of 1 to 30 percent by weight. Appropriate examples of such ternary materials are given in U.S. Pat. No. 3,034,119, issued Mar. 6, 1962. Chlorine, bromine, selenium, thallium or tellurium may be substituted for iodine.

A multitude of binary compounds and mixtures have been found to be useful for the inorganic material of the overlayer 16. Examples of such binary compounds or mixtures comprise halides of metals, such as copper, antimony, arsenic, sulfur, thallium, lead, cadmium and silver, and sulfides, selenides and tellurides of such metals. The most suitable materials, presenting substantial electromagnetic radiation sensitivity when deposited on a metallic layer of copper, silver, lead, zinc, etc., for example, are arsenic-sulfur mixtures and compounds, antimony-sulfur compounds and mixtures, silver-sulfur compounds and mixtures, bismuth-sulfur compounds and mixtures, chromium-sulfur compounds and mixtures, lead iodide, copper chloride, stannous chloride, mercury chloride, arsenic selenides, selenium-sulfur compounds and mixtures, chromium selenides, and indium-sulfur compounds and mixtures. It seems that the property of reacting with a layer of silicon or a metallic layer under the influence of electromagnetic actinic radiation is shared by a variety of mixtures and compounds, having such property to varying but generally useful degrees. Such binary compounds and mixtures may be generally cataloged as consisting of a metal halide or a mixture of a metal with a halogen, metal selenide or a mixture of a metal with selenium, metal sulfide or a mixture of a metal with sulfur, and metal telluride or a mixture of a metal with tellurium. Stoichiometric proportions are not critical, but it is preferable that the resulting material be substantially transparent to electromagnetic actinic radiations of an appropriate wavelength, specially when the overlayer is substantially thick.

Single elements, such as halogens, are also capable of reacting with a metallic layer, as defined herein, when exposed to electromagnetic actinic radiation.

A general grouping of inorganic materials suitable for forming an actinically reactive overlayer when disposed on a metallic layer, as defined herein, therefore consists of halogens, sulfur, selenium, M–X compounds and mixtures and M–X–Y compounds and mixtures, wherein M is a metal and X and Y are selected from the group consisting of halogen, sulfur, selenium and tellurium; the metal M in the compounds and mixtures is selected from the group consisting of arsenic, antimony, bismuth, selenium, tellurium, copper, zinc, cadmium, mercury, lead, chromium, gallium, indium, thallium, germanium, tin, iron, cobalt, nickel and silver.

A particularly suitable binary material presenting substantial sensitivity when deposited on a layer of silver, copper, cadmium, lead, zinc or other metal is an arsenic-sulfur compound or mixture in a glassy or vitreous form and which presents remarkably good radiation transmissivity from the infrared to the ultraviolet region of the electromagnetic spectrum. For example, by using a vitreous overlayer 16 of arsenic-sulfur deposited upon a metallic layer 14 of silver, the quality of the image obtained in the finished article is remarkable in its resolution which may be as low as 500–1,000 A. The proportions of arsenic and sulfur may be any adequate proportions which permit to obtain a vitreous material, such proportions preferably ranging from about 40 percent arsenic–60 percent sulfur by weight to 70 percent arsenic–30 percent sulfur by weight.

In copending application Ser. No. 839,038, filed July 3, 1969, there is disclosed several examples of preparation of electromagnetic-radiation-sensitive elements according to the invention.

For example, vapor deposition techniques may be used for depositing on a continuous web of paper, cardboard or plastic, a substantially thin film of silicon or an appropriate metal for forming the metallic layer and for depositing on the top of the metallic layer an overlayer of any of the inorganic materials hereinbefore listed.

As a typical example of a preferred method for manufacturing electromagnetic-radiation-sensitive elements according to the present invention, an apparatus such as schematically shown at FIG. 9 is used. The apparatus comprises an evacuated chamber 60 provided with appropriate vacuum pumps, not shown, for maintaining in the chamber an average pressure of about 0.5 micron. The substrate or support member in the form of a web of, for example, paper of an appropriate width is unwound from a supply reel 62 to a power driven reel 64, both reels being disposed in the evacuated chamber 66. Baffles 65, 66, and 67 are disposed in the evacuated chamber 60 so as to divide it in a metal evaporation chamber 68 and an overlayer evaporation chamber 70, the web of paper 12 being translated into the first chamber 68, from the first chamber 68 to the second chamber 70, and from the second chamber 70 through appropriate slots 71, 72, and 73, respectively in the baffles 65, 66, and 67. In the metal evaporation chamber 68 are disposed tungsten electrical resistance heaters 74 brought to about 1,100° C. by the passage of electrical current therethrough and adapted to continuously evaporate a metal such as for example silver, from a ribbon or thin wire of such metal, not shown, continuously fed to the tungsten electrical resistance heaters 74 by automatic feeding means. Using a velocity of translation of the paper web 12 of approximately 10 feet per minute through both chambers 68 and 70, and by having the chamber 68 approximately 10 inches long, a condensed silver layer on the paper 12 is obtained which has a thickness of approximately 4,000 A. the translated paper web 12 being disposed approximately 6 inches from the tungsten resistance heaters 74. The second evaporation chamber 70, disposed between the baffles 66 and 67, contains a plurality of quartz crucibles, such as schematically shown at 76, loaded with an appropriate inorganic material, such as for example a mixture of arsenic and sulfur in a proportion of 50–50 percent by weight. The quartz crucibles are disposed on electrical heaters and are heated at a temperature of 350°–400° C., and the mixture is evaporated from the crucible disposed approximately a foot from the surface of the paper web 12 previously coated with a thin film of silver. A thin film of arsenic-sulfur inorganic material, forming the overlayer, is deposited on the surface of the silver layer by evaporating the mixture from the quartz crucibles in the evaporation chamber 70 for about 40 to 50 seconds, providing a thickness of the inorganic material overlayer of also approximately 4,000 A. At a line speed of 10 feet per minute, the length of the evaporation chamber 70 between the baffles 66 and 67 is about 10 feet. The finished continuous web of radiation-sensitive element 10 is continuously wound on the power drive reel 64.

Longer deposition times result in proportionally thicker metallic layers and inorganic overlayer and shorter deposition times obviously result in thinner layers. With the arrangement of FIG. 9, ample latitude is provided for whatever deposition times are suitable by varying the speed of translation of the paper web 12 and by varying the location of the baffles 65, 66, and 67, thus providing evaporation chambers of appropriate lengths.

Any one of the herein mentioned inorganic materials may be substituted for the arsenic-sulfur material, and other techniques may be used for depositing the inorganic material overlayer upon the metallic layer. For example, the inorganic material may be dissolved in an appropriate solvent and painted or sprayed over the surface of the metallic layer, or cathode sputtering and other techniques may be used with equal success.

For illustrative purpose, helpful in explaining and understanding the principles of the present invention, for the sake of the present discussion, the invention will be hereinafter described with respect to a radiation sensitive element 10, FIGS. 1 and 2, consisting of a paper base 12 coated with a thin film of pure silver forming the metallic layer 14 having a thickness of a few thousand angstroms. The metallic layer 14 is coated in turn with a solid overlayer 16, of arsenic-sulfur, also of a thickness of a few thousand angstroms in a solid glassy form. The radiation-sensitive element 10 is first exposed to impinging electromagnetic actinic radiation, as shown in FIGS. 1 and 2, with a mask 18 being interposed in the path of the incident electromagnetic actinic radiation 20, consisting of intense white light provided by a conventional source such as strong incandescent lamp. Portions of the mask 18, as shown at 22, are substantially transmissive of the electromagnetic radiation, which other portions, as shown at 24, are substantially nontransmissive. Consequently, the surface of the sensitive element 10 is selectively and discretely irradiated at the areas, such as shown at 26, corresponding to the transmissive portions 22 of the mask 18, while other portions 30 of the surface of the radiation-sensitive element 10 are shielded from the electromagnetic radiation 20, such areas 30 of the radiation-sensitive element corresponding to the areas 24 of the mask 18 being substantially nontransmissive of the electromagnetic radiation. It is obvious that, alternately, an appropriate image may be projected upon the radiation-sensitive element by conventional optical projection means.

After exposure of the radiation-sensitive element 10 for a predetermined period of time, amounting at most to a few seconds, there is a radiation provoked interreaction between the inorganic material of the overlayer 16 with the metal of the metallic layer 14 at the areas 26 subjected to such irradiation with the formation of interreaction product 32, as shown at FIG. 3, exhausting in depth all of the metal, silver in the present example, of the metallic layer 14. The areas 30, FIGS. 1 and 2, of the radiation-sensitive element not subjected to irradiation are left undisturbed, as shown at 34 in FIG. 3, each such area 34 comprising a pattern consisting of the remaining of the metallic layer 14 with an adhering coating of the overlayer 16 corresponding to the nontransmissive areas 24 of the mask 18 of FIGS. 1 and 2, or corresponding to the dark areas of the image projected upon the radiation-sensitive element. After removal of the interreaction product 32, the finished article is as article 11 of FIG. 4, consisting exclusively of the paper base 12 having an adhering pattern thereon of the areas 34 consisting of the remaining portions of respectively the silver layer 14 and the arsenic-sulfur overlayer 16. For some applications, such an article may be found to be perfectly suitable and may be used as such without further processing.

If it is desired to remove the remaining of the overlayer 16, such remaining of the overlayer 16 may be removed by any one of a plurality of means, such as heat sublimation, chemical dissolution or mechanical removal as explained in the parent application and the copending applications, although it must be appreciated that in most applications it is possible to remove simultaneously both the interreaction product 32 and the remaining portions of the overlayer 16 in a single operation, by such mechanical, chemical or heat sublimation processes, or according to the means hereinafter explained in detail, for providing article 11 of FIGS. 5 and 7.

By operating with a radiation-sensitive element consisting of a flexible or pliable base, such as paper for example, coated with a thin metallic layer, such as silver, in an atmosphere laden with vapor of the material of the overlayer, such as arsenic trisulfide vapor, the interreaction product or products are automatically sublimated as formed and the finished article 11′ consists exclusively of the base 12 provided with a metallic pattern, as shown as 36 in FIGS. 5 and 7, such metallic pattern consisting of the remaining portions of the original radiation-sensitive element which were not subjected to irradiation.

Such finished article, as shown at 11′ in FIGS. 5 and 7, is identical to the finished article that can be obtained from article 11 of FIG. 4 after removal of the overlayer 16 which, as previously explained, may be accomplished at the same time as the removal of the interreaction product 32 of FIG. 3, is effected. For some applications, for example where it is desired to provide a high contrast reproduction of the original image, it may be desirable to dye, tone or darken the metallic image 36 of the article 11′ of FIGS. 5 and 7. This can be accomplished by treating the metallic image 36 with any appropriate dye, toner or darkening agent. For example, in applications where the metallic image 36 is a silver image, the contrast thereof relative to the background of base 12 may be intensified or the image may be darkened by being subjected to hydrogen sulfide vapor. After darkening, the resultant article is as schematically shown at FIG. 8 with the metallic silver image 36 appropriately darkened so as to be endowed with a high-contrast appearance relative to the background provided by the paper base 12.

FIG. 6 schematically illustrates an arrangement for automatic processing of a radiation-sensitive element 10 in the form of a continuous web for obtaining a finished article in the form, for example, of a print of an original image or a succession of original images. The web of radiation-sensitive element 10 is obtained from a supply reel or drum 40, on the periphery of which it is wound. Appropriate intermittent driving means, for example as shown at 42, are provided for unwinding and feeding suitable lengths of the radiation-sensitive element from the supply reel or drum. An exposure station 44 is provided at which consecutive lengths of the continuous web of the radiation-sensitive element 10 are irradiated during each dwell period of the intermittent drive 42, by means of a projection lantern 46, or the equivalent thereof, adapted to focus upon the surface of the radiation-sensitive element an appropriate image for a predetermined period of time at a suitable intensity of illumination. After exposure, the web of radiation-sensitive element 10 is forced to bend at a stripping station 48 over a continuously rotating small radius roller 50 causing the remaining portions of the overlayer to break in small fragments which easily separate from the metallic underlayer. Such remaining areas of the overlayer correspond to the areas of the radiation-sensitive element which have not been subject to illumination, while the interreaction product of the areas which have been irradiated during exposure are also caused to break in small fragments which easily separate from the paper base. The bending of the web of exposed sensitive material over roller 50 is all that is required to remove both the remaining of the overlayer and the interreaction product, while the portions of the metallic layer corresponding to the areas which have not been irradiated during exposure remain adhering to the paper base. Such easy stripping of the sensitive element web is particularly pronounced as a result of using a radiation-sensitive element consisting of a paper base with a thin coating of silver metal covered in turn with a glassy overlayer of arsenic-sulfur. The areas of the radiation sensitive element which have been exposed to the action of incident light, which remains glassy in appearance, separate from the paper base substantially in the same manner as the remaining portions of the arsenic-sulfur overlayer which had not been subjected to incident electromagnetic actinic radiation during exposure. The explanation for such a result seems to be that the silver layer presents a strong adhesion bond with the paper base, such that the portions of the metallic layer which have not been reacted remain strongly adhering to the paper base during stripping. The reacted portions, however, present weak adhesion bond with the paper base in view of the fact that the metallic layer, at such areas, has been entirely consumed. The overlayer, made of arsenic-sulfur, is glassy in appearance and behavior such that, as a result of flexion or bending at a small radius, the arsenic-sulfur overlayer simply breaks and pops from the metallic layer. At the areas which have been exposed to irradiation, the formation of the interreaction product seems to cause a phenomenon substantially like ion or atomic migration from the metal of the metallic layer into the glassy material of the overlayer such that the interreacted areas, as a result of bending under a substantially small radius, also break in small fragments that pop out and separate from the paper base.

In applications where the overlayer is made of an inorganic material other than arsenic-sulfur mixtures, arsenic trisulfide, arsenic pentasulfide, arsenic, sulfur and iodine mixtures, and lead-iodine mixtures, which all form a relatively brittle vitreous material, it may be necessary to facilitate the separation of both the unreacted portions of the overlayer and the interreaction product from, respectively, the remaining of the metallic layer and the substrate or base, by wiping or brushing of the surface of the element during stripping, or by applying to the surface of the element a flexible sheet of material coated with a substantially strong adhesive, as explained in the aforesaid copending applications.

After stripping, the continuous web of now exposed and stripped radiation-sensitive element 10 presenting a metallic image on the paper base is passed through a toning station 52 where it is placed in contact with vapors 54 which, in the example of embodiment arbitrarily chosen where the metallic image is a silver image, consist preferably of hydrogen sulfide vapors. The continuous web having on its surface a toned or darkened image is then fed by means of feed rollers 56 to a cutting station 58 where, if so required, it is cut to appropriate lengths.

It is evident that if it is not necessary to tone or darken the image, the toning station 52 may be omitted, and it is further evident that the stripping station may be omitted in applications where the radiation-sensitive element consists simply of a paper, cardboard or the like base, having an adhering thin layer of metal which is exposed to electromagnetic radiation in an atmosphere of reactant inorganic material, such as arsenic trisulfide, arsenic pentasulfide or the like. In such applications the exposure stations 44 comprise a physical enclosure containing vapors of the reactant material and a suitable heating device.

It is obvious that the present invention has been described by means of a few illustrative examples thereof, and that many modifications and additions will be apparent to those skilled in the art, without departing from the spirit and scope of the invention.

What is claimed as novel is:

1. A method for making a permanent reproduction of an image by means of an electromagnetic-radiation-sensitive element comprising a flexible sheet of a substrate selected from the group consisting of paper, cardboard and plastic, a substantially thin layer on a surface of said flexible sheet of a first material selected from the group consisting of silver, copper, lead, cadmium, zinc, iron, tin, arsenic, bismuth, cobalt, germanium, indium, manganese, mercury, nickel, selenium, silicon, tellurium, thallium and vanadium, and an overlayer on said layer of an inorganic second material different from said first material and capable when exposed to electromagnetic actinic radiation to interreact with said first material so as to form an interreaction product having a composition and physical characteristics different from said first and second materials, said second material being substantially transmissive of said electromagnetic actinic radiation and being selected from the group consisting of sulfur, selenium, M–X compounds and mixtures and M–X–Y compounds and mixtures, wherein M is a metal selected from the group consisting of arsenic, antimony, bismuth, selenium, tellurium, copper, zinc, cadmium, mercury, lead, chromium, gallium, indium, thallium, germanium, tin, iron, cobalt, nickel and silver, and X and Y are selected from the group consisting of halogen, sulfur, selenium and tellurium, said method comprising:

selectively and discretely exposing said radiation-sensitive element to image forming electromagnetic actinic radiation with an intensity and for a period of time sufficient for selectively and discretely causing an interreaction between said first and second materials with the formation of said interreaction product selectively and discretely etching said first material, maintaining said element substantially at room temperature while projecting said electromagnetic actinic radiation image thereon; and removing said interreaction product.

2. The method of claim 1 wherein the material of said overlayer is in a solid phase.

3. The method of claim 1 wherein the material of said overlayer is in a vapor phase.

4. The method of claim 2 further comprising the step of removing said overlayer.

5. The method of claim 4 further comprising the step of toning said reproduction.

6. The method of claim 5 wherein said first material is silver and said toning is effected by hydrogen sulfide vapor.

7. The method of claim 4 wherein the steps for removing said interreaction product and said overlayer are effected simultaneously by momentarily bending said element after exposure to radiation around a substantially small diameter member.

* * * * *

TRI-115-A-6-1 UNITED STATES PATENT OFFICE

CERTIFICATE OF CORRECTION

Patent No. 3,637,378 Dated January 25, 1972

Inventor(s) ROBERT W. HALLMAN ET AL

It is certified that error appears in the above-identified patent and that said Letters Patent are hereby corrected as shown below:

IN THE SPECIFICATION

Column 2, line 64, before "metal" cancel "or" and insert a comma (,)

Column 3, line 29, change "3,034,119" to - - 3,024,119 - - line 36, after "sulfides," insert - - arsenides, - -

Signed and sealed this 29th day of August 1972.

(SEAL)
Attest:

EDWARD M.FLETCHER,JR.
Attesting Officer

ROBERT GOTTSCHALK
Commissioner of Patents